LOGIC SYSTEM

Filed Jan. 30, 1961

INVENTOR
ROBERT M. MACINTYRE
BY HIS ATTORNEYS
HARRIS, KIECH, RUSSELL & KERN

United States Patent Office 3,219,985

Patented Nov. 23, 1965

3,219,985
LOGIC SYSTEM

Robert M. MacIntyre, Newport Beach, Calif., assignor, by mesne assignments, to Raytheon Company, a corporation of Delaware Filed Jan. 30, 1961, Ser. No. 85,582
8 Claims. (Cl. 340—174)

This invention relates to logic systems and, in particular, to logic systems utilizing magnetic gate elements with flux switching in multiple paths. The invention is particularly adapted for the switching of signals, permitting directing of any of a plurality of first or input amplifiers to any of a plurality of second or output amplifiers. The invention also relates to a new and improved magnetic gate element utilizing a steady state current and a current pulse for control, sometimes referred to herein as the D.C. strobe element.

It is an object of the invention to provide a logic system incorporating a plurality of magnetic gate elements for performing a large number of *and* operations with the *and* outputs *ored* together. A further object is to provide a logic system for matrix switching of such inputs wherein only one gate is ordinarily active at a given time. A further object is to provide such a logic system which does not use or require logic diodes.

It is an object of the invention to provide a logic system including a plurality of magnetic gate elements with each of the elements having first and second nonparallel openings therethrough, a plurality of logic input conductors with a logic input conductor passing through a first opening of each element respectively, a plurality of strobe conductors with a strobe conductor passing through a second opening of each element respectively, an output conductor passing through the first opening of each of the elements, means for generating a D.C. current through the second opening of each of the elements, a plurality of logic current pulse sources with a logic pulse source connected to a logic input conductor of each element respectively, and a plurality of strobe current pulse sources with a strobe pulse source connected to a strobe conductor of each element respectively. A further object is to provide such a system in which the strobe current is opposite in polarity and of approximately equal magnetizing force to the D.C. current through the gate element, with each element producing an *and* operation for the logic and strobe pulses and with all the elements producing an *or* operation on the output conductor for the plurality of *and* results.

It is another object of the invention to provide a logic system incorporating a matrix of gate elements assembled as set out in the preceding paragraph including a plurality of output conductors, with an output conductor passing through the first openings of a series of elements from each row and column of the matrix.

It is a specific object of the invention to provide a D.C. strobe gate element in the form of a block of magnetic material having two stable states of magnetic remanence and first and second nonparallel openings therethrough such that a current through an opening produces a flux about such opening and substantially zero net flux about the other opening, a logic input conductor passing through the first opening and a strobe conductor passing through the second opening, means for generating a D.C. current through the second opening for producing a flux in one direction about the second opening, a current pulse source connected to the logic input conductor for producing a flux about the first opening, another current pulse source connected to the strobe conductor for producing a flux about the second opening opposite in direction and of approximately equal magnitude to that of the D.C. current, with concurrence of the current pulses producing flux switching about the first opening, and means for detecting flux changes occurring about the first opening. A further object is to provide such a gate element wherein the openings therethrough are orthogonal and interconnecting.

It is also an object of the invention to provide a new and novel process for a logical operation including continuously inducing a magnetic flux in one direction about one opening of a block of magnetic material, inducing a magnetc flux in the opposite direction about the one opening to produce approximately zero total flux about the opening for a first period, inducing a magnetic flux about the other opening for a second period with the two periods existing concurrently and with the second period terminating before the first, and detecting flux changes occurring about the other opening at the termination of the first period.

Other objects, advantages, features and results of the invention will more fully appear in the course of the following description. The drawings merely show and the description merely describes preferred embodiments of the present invention which are given by way of illustration or example.

Figures 1, 2, 3:
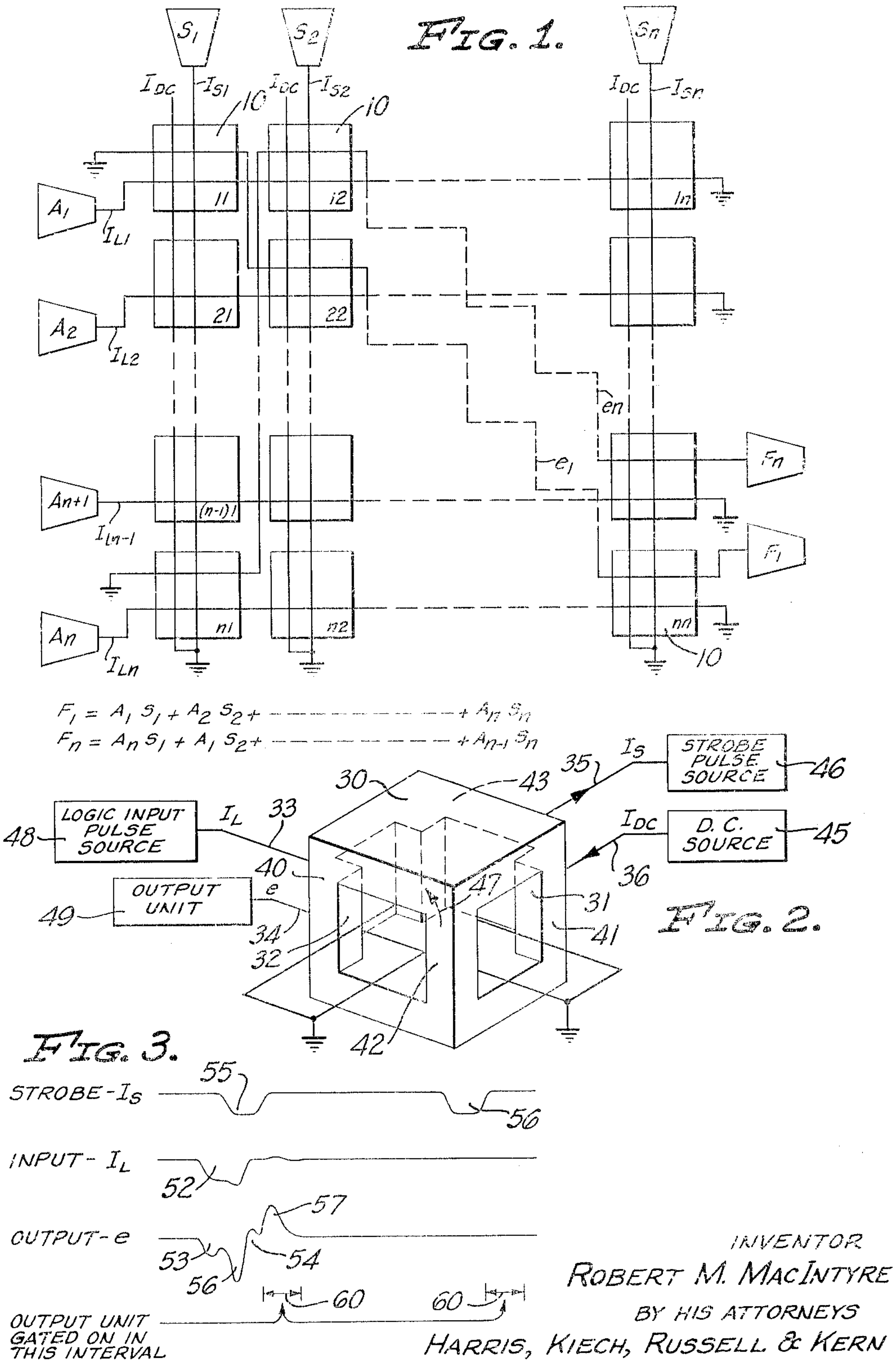
FIG. 1 is a schematic diagram of a preferred embodiment of the logic system of the invention.
FIG. 2 illustrates a magnetic gate element suitable for use in the system of FIG. 1.
FIG. 3 is a timing diagram illustrating the operation of the gate element of FIG. 2.

FIG. 1 illustrates a logic system in the form of a matrix of magnetic gate elements 10 arranged in *n* rows and *n* columns. The individual gate elements are identified by their position in the matrix, e.g., 1 1, 1 2 . . . , 1*n* . . . . While the plurality of gate elements 10 is shown arranged in the rows and columns of FIG. 1, it is understood that the actual physical positioning of the elements is not significant so long as the interconnections are made to provide the rows and columns.

One of the magnetic gate elements is shown in FIG. 2. The element comprises a block 30 of magnetic material having two stable states of magnetic remanence. Openings 31, 32 are provided in the block. An input conductor 33 and a sense or output conductor 34 are passed through the opening 31. A strobe conductor 35 and a D.C. conductor 36 are passed through the opening 32. Each of the conductors is shown as a single turn winding, but any conductor may be looped through the opening one or more times to provide a multiturn winding when desired.

The shape of the block 30 is not critical and the openings 31, 32 are disposed relative to each other such that their axes are nonparallel. Then a current in a conductor through an opening can produce a flux about such opening with substantially zero net flux about the other opening. This relation is best achieved by having the openings at right angles to each other and intersecting. The openings may be displaced from each other but it is preferred that there be no magnetic material between the openings at their crossing, i.e., that the openings interconnect. Any magnetic material will be suitable for use with the gate element and pressed ferrite materials are presently being used.

The basic operation of the magnetic gate element is as follows. When a sufficient amount of current is applied to a conductor through one opening, the magnetic material about such opening will become saturated or set in one state of magnetic remanence. Then when a current is applied to a conductor through the other opening of a magnitude to saturate the magnetic material about such opening, the magnetic flux in one pair of diagonally opposed legs (e.g., legs 40, 41) will reverse or switch while the flux in the opposite pair of diagonally opposed legs (legs 42, 43) will shuttle. The increase of flux from a magnetic remanence state to a maximum in the same polarity and return to the remanence state is defined as shuttling. Flux change occurring about an opening will generate a voltage on a conductor through the opening.

In the D.C. strobe gate element of FIG. 2, a D.C. current is provided on the conductor 36 from a D.C. source 45. A current pulse is provided on the conductor 35 from a strobe pulse source 46. The currents in the conductors 35, 36 are selected to be in the opposite polarity and to provide approximately the same magnetizing force. For single turn windings as shown in FIG. 2, the amplitude of the strobe current pulse will be about equal to the amplitude of the D.C. current. In the absence of a current pulse from the strobe source 46, the D.C. current will produce a flux about the opening 32 in the direction shown by the arrow 47. During the existence of a strobe current pulse, the net current through the opening 32 will be zero and the net flux about the opening will drop to the remanence value. Exact net zero current is not necessary, but is desirable as it improves the signal-to-noise ratio.

Current pulses are provided on the conductor 33 by a logic input pulse source 48. In the preferred embodiment shown herein, only a single logic input conductor is utilized, but additional logic input conductors can be provided where desired. An output unit 49 in the form of a gated amplifier is connected to the conductor 34 for sensing voltage signals generated on the conductor 34 at particular times.

The operation of the gate element is shown in the timing diagram of FIG. 3. The D.C. current on the conductor 36 is producing a flux about the opening 32. A current pulse 52 on the logic input conductor 33 will produce flux switching about the opening 31, resulting in an output pulse 53 during the rise of the pulse 52 and another output pulse 54 during the decay of the pulse 52. A current pulse 55 on the strobe conductor 35 will cancel the flux due to the D.C. current for the duration of the pulse 55, resulting in a larger pulse output 56 during the rise of the pulse 55 and another larger pulse output 57 during the decay of the pulse 55.

The output unit 49 is gated on during the interval indicated at 60 so that only the output produced by the decay of the strobe current pulse 55 is sensed as an output. This prevents the voltages generated on the output conductor by the logic input pulse from being considered outputs. Hence, it is seen that an output signal is produced only when there is concurrence between the logic input current pulse and the strobe current pulse. As seen in the diagram of FIG. 3, a subsequent strobe current pulse 56 will reduce the flux about the opening 32 but, in the absence of a logic input current pulse, no flux switching about the opening 31 occurs. The gate element operates as an *and* gate, producing an output pulse when there is concurrence of pulses on the logic input conductor 33 and the strobe conductor 35.

FIG. 1 illustrates a system for performing the operation $$F_1 = A_1S_1 + A_2S_2 + \cdots + A_nS_n$$
$$\vdots$$
$$F_n = A_nS_1 + A_1S_2 + \cdots + A_{n-1}S_n$$

A logic input conductor $I_{L1}$ is threaded through each block of the first row. Similar logic input conductors are threaded through the blocks of each succeeding row. A strobe conductor $I_{S1}$ is threaded through the blocks of the first column and similar strobe conductors are threaded through the blocks of each succeeding column. Similarly, a D.C. current conductor $I_{dc}$ is threaded through the blocks of each column of the matrix. An output conductor $e_1$ is threaded through the string of blocks 1 1, 2 2, . . . *nn*, to provide the *or* operation $F_1$. Similar output conductors are threaded through corresponding strings of blocks in each row and column to provide the succeeding outputs.

A D.C. current source is connected to each of the D.C. current conductors. A strobe current source $S_1$ is connected to the conductor $I_{S1}$ and similar current sources are connected to the other strobe current conductors. A logic input current source $A_1$ is connected to the conductor $I_{L1}$ and similar sources are connected to the remaining logic input conductors. An output unit $F_1$ is connected to the output conductor $e_1$ and similar output units are connected to the other output conductors.

Each of the magnetic gate elements of the matrix of FIG. 1 performs an *and* operation for the particular strobe and logic inputs coupled thereto. An *or* operation is performed for the *and* results of all of the elements on an output conductor string. The embodiment of FIG. 1 is particularly adapted for use where a large number of two input *and* gates are to be *ored* together and only one of these gates will be active at a given clock time. The logic input pulse sources $A_1 \ldots A_n$ will ordinarily be gated current amplifiers which are driven from the preceding logic system. The strobe pulse sources $S_1 \ldots S_n$ may be gated amplifiers which are driven by the clock or strobe oscillator and controlled by a separate selection system to determine which column is to be energized.

When operated as above with only one strobe conductor carrying current at any particularly time, only one magnetic gate element is switched at any particular time. This limits the voltage driving requirement on the logic input source and permits a large number of elements to be used in a matrix. With the present invention, *n* may be fifty or a higher, as compared to a limit of ten in prior art logic systems. More than one strobe conductor may be energized at one time to perform more complex logical operations if desired.

The matrix of FIG. 1 provides a logic switching system which permits switching of an output from any one of the logic sources $A_1 \ldots A_n$ to any of the output units $F_1 \ldots F_n$. This is accomplished by energizing, concurrently with the logic input pulse, the strobe conductor of the gate element which includes the conductors of the particular logic source and output unit amplifiers of interest.

One advantage of the logic system utilizing the D.C. strobe element is that flux inhibiting action by concurrent pulses is not necessary during the setting of the gate element, that is during the period of the logic input pulse. With no inhibit action wherein one pulse cancels another, restrictions on pulse width, pulse height, and timing are decreased. The utilization of concurrent pulses on the logic input and strobe conductors decreases the total time required to complete a logic operation. Hence, the repetition rate may be materially increased and the performance requirements on the associated equipment decreased. Since only one gate element on an output string is set, the back voltage or reaction voltage on the input source is minimized during the logic input pulse period. Similarly, since only that element which has been set is strobed, the back voltage is also minimized during the strobe period. As there is only one sense conductor through each element, there is no possibility of noise due to load currents in other output conductors. Also, the noise voltage produced by all of the elements on an output string is exceedingly small since only one element in the string is strobed at any one time.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a logic system, the combination of:

a plurality of magnetic gate elements, each of said gate elements comprising a block of magnetic material having two stable states of magnetic remanence and first and second nonparallel openings therethrough such that a current through an opening produces a flux about such opening and substantially zero net flux about the other opening;

a plurality of logic input conductors, with a logic input conductor passing through a first opening of each element respectively;

a plurality of strobe conductors, with a strobe conductor passing through a second opening of each element respectively;

an output conductor passing through the first opening of each of said elements;

means for generating a D.C. current through the second opening of each of said elements;

a plurality of logic current pulse sources, with a logic pulse source connected to each logic input conductor respectively;

and a plurality of strobe current pulse sources, with a strobe pulse source connected to each strobe conductor respectively to provide a strobe current opposite in polarity and of approximately equal magnetizing force to the D.C. current therethrough, with each element producing an *and* operation for the logic and strobe pulses and with all the elements producing an *or* operation on the output conductor for the plurality of *and* results.

2. In a logic system, the combination of:

a plurality of magnetic gate elements arranged in a matrix of rows and columns, each of said gate elements comprising a block of magnetic material having two stable states of magnetic remanence and first and second nonparallel openings therethrough such that a current through an opening produces a flux about such opening and substantially zero net flux about the other opening;

a plurality of logic input conductors, with a logic input conductor passing through the first openings of the elements of each row respectively;

a plurality of strobe conductors, with a strobe conductor passing through the second openings of the elements of each column respectively;

a plurality of output conductors, with an output conductor passing through the first openings of a series of elements from each row and column;

means for generating a D.C. current through the second opening of each of said elements;

a plurality of logic current pulse sources, with a logic pulse source connected to each logic input conductor respectively;

and a plurality of strobe current pulse sources, with a strobe pulse source connected to each strobe conductor respectively to provide a strobe current opposite in polarity and of approximately equal magnetizing force to the D.C. current therethrough, with each element producing an *and* operation for the logic and strobe pulses and with all the elements in a series producing an *or* operation on the corresponding output conductor for the plurality of *and* results.

3. In a logic system, the combination of:

$n^2$ magnetic gate elements arranged in a matrix of $n$ rows and $n$ columns, each of said gate elements comprising a block of magnetic material having two stable states of magnetic remanence and first and second non-parallel openings therethrough such that a current through an opening produces a flux about such opening and substantially zero net flux about the other opening;

$n$ logic input conductors, with a logic input conductor passing through the first openings of the elements of each row respectively;

$n$ strobe conductors, with a strobe conductor passing through the second openings of the elements of each column respectively;

$n$ output conductors, with an output conductor passing through the first openings of a series of $n$ elements selected to include an element in each row and in each column;

means for generating a D.C. current through the second opening of each of said elements;

$n$ logic current pulse sources, with a logic pulse source connected to each logic input conductor respectively;

and $n$ strobe current pulse sources, with a strobe pulse source connected to each strobe conductor respectively to provide a strobe current opposite in polarity and of approximately equal magnetizing force to the D.C. current therethrough, providing the logical operation $$F_1=A_1S_1+A_2S_2+ \dots +A_nS_n$$

on the first of said output conductors and corresponding operations on succeeding output conductors, where A represents a logic input pulse and S represents a strobe input pulse.

4. In a logic switching system for coupling the output of any one of a plurality of first amplifiers to the input of any one of a plurality of second amplifiers by energizing one of a plurality of strobe pulse sources, the combination of:

a plurality of magnetic gate elements arranged in a matrix of rows and columns, each of said gate elements comprising a block of magnetic material having two stable states of magnetic remanence and first and second nonparallel openings therethrough such that a current through an opening produces a flux about such opening and substantially zero net flux about the other opening;

a plurality of logic input conductors, with each logic input conductor connected to the output of a first amplifier and passing through the first openings of a row of elements;

a plurality of strobe conductors, with each strobe conductor connected to the output of a strobe pulse source and passing through the second openings of a column of elements;

a plurality of output conductors, with each output conductor connected to the input of a second amplifier and passing through the first openings of a series of elements from each row and column;

and means for generating a D.C. current through the second opening of each of said elements, with the selected one strobe pulse source providing a strobe current opposite in polarity and of approximately equal magnetizing force to the D.C. current through the elements, and with concurrence of a strobe current pulse and a first amplifier output current at an element providing an output pulse on the output conductor of such element.

5. In a logic system, the combination of:

a plurality of magnetic gate elements, each of said gate elements comprising a block of magnetic material having two stable states of magnetic remanence and first and second orthogonal and interconnecting openings therethrough such that a current through an opening produces a flux about such opening and substantially zero net flux about the other opening;

a plurality of logic input conductors, with a logic input conductor passing through a first opening of each element respectively;

a plurality of strobe conductors, with a strobe conductor passing through a second opening of each element respectively;

an output conductor passing through the first opening of each of said elements;

means for generating a D.C. current through the second opening of each of said elements;

a plurality of logic current pulse sources, with a logic pulse source connected to each logic input conductor respectively;

and a plurality of strobe current pulse sources, with a strobe pulse source connected to each strobe conductor respectively to provide a strobe current opposite in polarity and of approximately equal magnetizing force to the D.C. current therethrough, with the strobe and logic current pulses of approximately the same duration and with the strobe pulses starting during the period of the logic pulses, with each element producing an *and* operation for the logic and strobe pulses and with all the elements producing an *or* operation on the output conductor for the plurality of *and* results.

6. A logic system gate element comprising:

a block of magnetic material having two stable states of magnetic remanence and first and second nonparallel openings therethrough such that a current through an opening produces a flux about such opening and substantially zero net flux about the other opening;

at least one logic input conductor passing through the first opening of said block;

at least one strobe conductor passing through the second opening of said block;

means for generating a D.C. current through said second opening for producing a flux in one direction about said second opening;

a current pulse source connected to the logic input conductor for generating a logic current pulse producing a flux about said first opening;

a current pulse source connected to the strobe conductor for generating a strobe current pulse producing a flux about said second opening opposite in direction and of approximately equal magnitude to that of the D.C. current, with concurrence of said logic and strobe current pulses producing flux switching about said first opening;

and means for detecting flux changes occurring about said first opening in response to said concurrence of said logic and strobe pulses.

7. A logical *and* circuit comprising:

a block of magnetic material having two stable states of magnetic remanence and first and second nonparallel openings therethrough such that a current through an opening produces a flux about such opening and substantially zero net flux about the other opening;

a first and second conductor each passing through the first opening of said block;

a third conductor passing through the second opening of said block;

a first source of signals connected to said first conductor for continuously inducting a magnetic flux in one direction about one of the openings;

a second source of signals connected to said second conductor for inducing a magnetic flux in the opposite direction about said one opening to product approximately zero total flux about the opening for a first period;

a third source of signals connected to said third conductor for inducing a magnetic flux about the other opening for a second period, with the two periods existing concurrently and with the second period terminating before the first;

and means for detecting flux changes occurring about the other opening at the termination of the first period in response to the concurrence of signals from both said second and third sources.

8. In a logic switching system for shifting an $n$ bit word, generated in parallel at the output of $n$ first amplifiers, $x$ bits, to provide the input in parallel of $n$ second amplifiers, by energizing only one of a plurality of strobe pulse sources, where $x$ ranges from 1 to $n$, the combination of:

a plurality of magnetic gate elements arranged in a matrix of rows and columns, each of said gate elements comprising a block of magnetic material having two stable states of magnetic remanence and first and second nonparallel openings therethrough such that a current through an opening produces a flux about such opening and substantially zero net flux about the other opening;

a plurality of logic input conductors, with each logic input conductor connected to the output of a first amplifier and passing through the first openings of a row of elements;

a plurality of strobe conductors, with each strobe conductor connected to the output of a strobe pulse source and passing through the second openings of a column of elements;

a plurality of output conductors, with each output conductor connected to the input of a second amplifier and passing through the first openings of a series of elements from each row and column;

and means for generating a D.C. current through the second opening of each of said elements, with the selected one strobe pulse source providing a strobe current opposite in polarity and of approximately equal magnetizing force to the D.C. current through the elements, and with concurrence of a strobe current pulse and a first amplifier output current at each element of a column providing an output pulse on each output conductor, and with the order of pulses at the second amplifier inputs shifted from the order of pulses at the first amplifier output shifted $x$ bits as determined by the particular strobe conductor energized.

References Cited by the Examiner

UNITED STATES PATENTS

| | | | |
|---|---|---|---|
| 2,691,156 | 10/1954 | Saltz | 340—174 |
| 2,734,184 | 2/1956 | Rajchman. | |
| 2,983,829 | 5/1961 | Wanlass | 340—174 |
| 2,985,768 | 5/1961 | Bobeck | 340—174 |
| 3,060,321 | 10/1962 | Woods | 340—174 |
| 3,119,011 | 1/1964 | Franck | 340—174 |

OTHER REFERENCES

Publication I: Electronic Design, August 5, 1959, pp. 28–31.

IRVING L. SRAGOW, *Primary Examiner.*

JOHN F. BURNS, *Examiner.*